United States Patent
Eom et al.

(10) Patent No.: US 10,571,727 B2
(45) Date of Patent: Feb. 25, 2020

(54) COVER SUBSTRATE AND TOUCH WINDOW INCLUDING SAME

(71) Applicant: LG INNOTEK CO., LTD., Seoul (KR)

(72) Inventors: Seong Su Eom, Seoul (KR); Jong Seon Jeong, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 181 days.

(21) Appl. No.: 15/554,661

(22) PCT Filed: Feb. 23, 2016

(86) PCT No.: PCT/KR2016/001759
§ 371 (c)(1),
(2) Date: Aug. 30, 2017

(87) PCT Pub. No.: WO2016/140457
PCT Pub. Date: Sep. 9, 2016

(65) Prior Publication Data
US 2018/0039127 A1     Feb. 8, 2018

(30) Foreign Application Priority Data

Mar. 2, 2015   (KR) .................. 10-2015-0029036
Mar. 12, 2015  (KR) .................. 10-2015-0034680

(51) Int. Cl.
*G02F 1/1333*     (2006.01)
*G02F 1/1343*     (2006.01)
(Continued)

(52) U.S. Cl.
CPC .... *G02F 1/133308* (2013.01); *G02F 1/13338* (2013.01); *G02F 1/134309* (2013.01);
(Continued)

(58) Field of Classification Search
CPC ......... G02F 1/133308; G02F 1/134309; G02F 1/13338; G02F 2001/133331; G06F 3/044;
(Continued)

(56) References Cited

U.S. PATENT DOCUMENTS 6,501,599 B1   12/2002   Randolph et al.
9,256,300 B2   2/2016    Chou et al.
(Continued)

FOREIGN PATENT DOCUMENTS

JP   2005-149102   6/2005
JP   2012-048274   3/2012
(Continued)

OTHER PUBLICATIONS

International Search Report (with English Translation) and Written Opinion dated Jun. 20, 2016 issued in Application No. PCT/KR2016/001759.
(Continued)

*Primary Examiner* — Andrew Sasinowski
(74) *Attorney, Agent, or Firm* — KED & Associates, LLP

(57) ABSTRACT

The present invention relates to a cover substrate of a display, the cover substrate comprising: one surface having curvatures in at least two directions; and the other surface having a curvature in one direction. A touch device including the cover substrate comprises: a touch window having a curved surface; and a display panel on the touch window, wherein the touch window comprises: the cover substrate having curvatures in at least two directions; and a first sensing electrode and a second sensing electrode on the cover substrate, and the display panel has a curved surface.

20 Claims, 15 Drawing Sheets

(51) Int. Cl.
  *G06F 3/044* (2006.01)
  *G06F 3/041* (2006.01)
(52) U.S. Cl.
  CPC ............ *G06F 3/044* (2013.01); *G06F 3/0412* (2013.01); *G02F 2001/133331* (2013.01); *G06F 2203/04112* (2013.01)
(58) Field of Classification Search
  CPC ......... G06F 3/0412; G06F 2203/04103; G06F 2203/04112
  See application file for complete search history.

(56) References Cited

U.S. PATENT DOCUMENTS

| | | | |
|---|---|---|---|
| 9,366,802 B2 | 6/2016 | Lee et al. | |
| 2011/0273383 A1 | 11/2011 | Jeon et al. | |
| 2011/0281072 A1 | 11/2011 | Sabia et al. | |
| 2012/0111479 A1 | 5/2012 | Sung et al. | |
| 2013/0321740 A1* | 12/2013 | An | H05K 5/0217 349/58 |
| 2014/0065430 A1* | 3/2014 | Yamazaki | H01L 27/1214 428/426 |
| 2014/0152631 A1* | 6/2014 | Moore | G09G 3/04 345/205 |
| 2014/0293153 A1 | 10/2014 | Wang et al. | |
| 2014/0340609 A1* | 11/2014 | Taylor | G02F 1/133308 349/58 |
| 2014/0347273 A1* | 11/2014 | Arrasvuori | G06F 3/0412 345/158 |
| 2014/0368782 A1 | 12/2014 | Kim et al. | |

FOREIGN PATENT DOCUMENTS

| | | |
|---|---|---|
| JP | 2013-025626 | 2/2013 |
| JP | 2014-026563 | 2/2014 |
| JP | 2014-111357 | 6/2014 |
| JP | 2014-191824 | 10/2014 |
| JP | 2015-022531 | 2/2015 |
| JP | 2015-026361 | 2/2015 |
| JP | 2015-031954 | 2/2015 |
| JP | 2015-036866 | 2/2015 |
| KR | 10-2011-0123987 | 11/2011 |

OTHER PUBLICATIONS

Japanese Office Action dated Jul. 31, 2018 issued in Application No. 2017-545915.

* cited by examiner

COVER SUBSTRATE AND TOUCH WINDOW INCLUDING SAME

CROSS-REFERENCE TO RELATED PATENT APPLICATIONS

This application is a U.S. National Stage Application under 35 U.S.C. § 371 of PCT Application No. PCT/KR2016/001759, filed Feb. 23, 2016, which claims priority to Korean Patent Application No. 10-2015-0029036, filed Mar. 2, 2015, and Korean Patent Application No. 10-2015-0034680 filed Mar. 12, 2015 whose entire disclosures are hereby incorporated by reference.

TECHNICAL FIELD

Embodiments relate to a cover substrate and a touch window including the same.

BACKGROUND ART

In recent years, touch panels are being applied to various electronics in a manner in which an input device such as a finger or stylus comes into contact with an image displayed on a display device to perform an input operation.

The touch panels may be typically classified into resistive touch panels and capacitive touch panels. In such a resistive touch panel, a touch position is sensed by sensing a change in resistance according to connection between electrodes when a pressure is applied to an input device. In such a capacitive touch panel, a change in electrostatic capacity between electrodes is sensed when a finger comes into contact with the touch panel to sense a touch position. In view of convenience of a manufacturing method and sensitiveness, the capacitive touch panel has attracted attention in a small model recently.

Recently, demands for bendable touch panels are increasing. Particularly, in case of display devices used for vehicles, demands for curved touch panels are increasing because the touch panels are applied to curved surfaces rather than flat surfaces.

Such a curved touch panel may be used in various technical fields as vehicles in combination with other structures such as LCDs. However, it is difficult to apply the touch panel having the curved surface to configurations of other vehicles.

Also, there is a limitation that a degree of freedom in design is deteriorated when the curved surface is formed.

Therefore, a substrate capable of solving the above-described limitation and a touch window to which the substrate is applied are required.

DISCLOSURE OF THE INVENTION

Technical Problem

Embodiments provide a cover substrate improved in degree of freedom in design, a touch window including the same and improved in reliability, and a touch device.

Technical Solution

A cover substrate according to an embodiment includes: one surface having curvatures in at least two directions; and the other surface having a curvature in one direction.

Advantageous Effects

In the cover substrate according to the embodiments, the one surface or the one surface of the first layer may have the plurality of curved surfaces that are bent in at least two directions and has the one curvature or the plurality of curvatures, and the other surface opposite to the one surface or the one surface of the second layer may have a single curved surface that is bent in one direction and has one curvature or the plurality of curvatures.

Therefore, the cover substrate of which the one surface and the other surface have curved surfaces different from each other may be realized. That is, the cover substrate of which only the one surface is bent on the cross-section in one direction, and all of the one surface and the other surface are bent on the cross-section in the other direction may be realized.

Therefore, when the cover substrate is applied to the display device or the touch device, the degree of freedom in design may be improved. That is, the cover substrate according to the embodiments may be easily coupled regardless of the position or the place at which the cover substrate is coupled. In addition, the degree of freedom in design may be improved by the configuration in which the one surface has the plurality of curved surfaces, and the other surface has the single curved surface.

MODE FOR CARRYING OUT THE INVENTION

Figure 1:
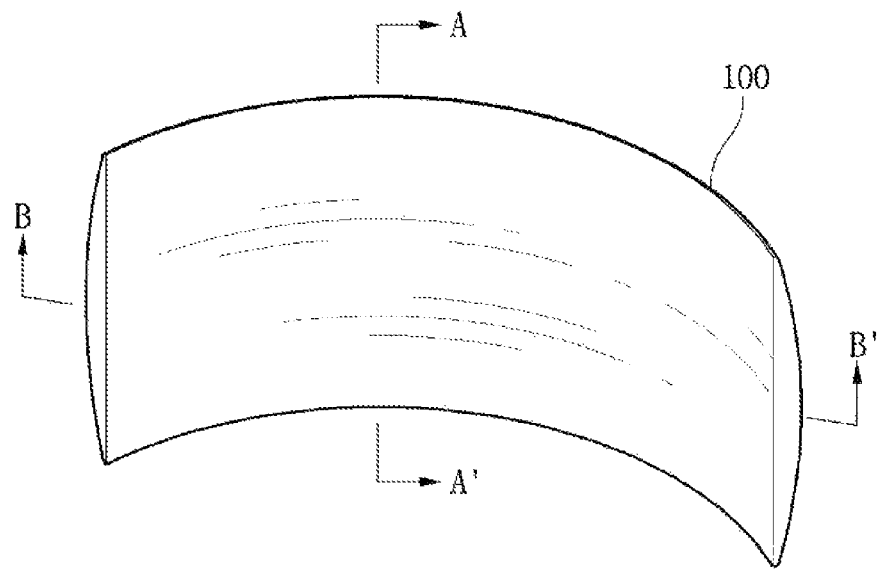
FIG. 1 is a perspective view of a cover substrate according to an embodiment.

In the description of embodiments, it will be understood that when a layer (or film), region, pattern or structure is referred to as being 'on' or 'under' another layer (or film), region, pad or pattern, the terminology of 'on' and 'under' includes both the meanings of 'directly' and 'indirectly'. Further, the reference about 'on' and 'under' each layer will be made on the basis of drawings.

Also, when one part is referred to as being "connected" to another part, it should be understood that the former can be "directly connected" to the latter, or "indirectly connected" to the latter via an intervening member. Furthermore, when it is described that one comprises (or includes or has) some elements, it should be understood that it may comprise (or include or has) only those elements, or it may comprise (or include or have) other elements as well as those elements if there is no specific limitation.

Hereinafter, exemplary embodiments will be described in detail with reference to the accompanying drawings.

Referring to FIGS. 1 to 10, a cover substrate 100 according to an embodiment may include one surface 101 and the other surface 102.

The one surface 101 and the other surface 102 of the cover substrate may include a curved surface. For example, at least one surface of the one surface 101 and the other surface 102 may include a curved surface. That is, at least one surface of the one surface 101 and the other surface 102 may be bent.

The one surface 101 and the other surface 102 may have curvatures in directions different from each other. Also, the one surface 101 and the other surface 102 may have the same curvature or curvatures different from each other.

Thus, in the cover substrate according to an embodiment, the one surface 101 and the other surface 102 may be disposed in various directions and have various curvatures to improve a degree of freedom in design. For example, the one surface 101 and/or the other surface 102 may have a predetermined curvature. For example, the one surface 101 may have curvatures in at least two directions. Also, the other surface 102 may have a curvature in one direction.

In detail, the one surface 101 may have a curvature R1 in a first direction and a curvature R2 in a second direction. Also, the other surface 102 may have the curvature R1 in the first direction or the curvature R2 in the second direction. That is, the other surface 102 may be bent in a direction corresponding to one direction of the bent directions of the one surface 101.

The first direction and the second direction may be different from each other. For example, the first direction and the second direction may extend in different directions at a predetermined angle therebetween on an area crossing each other. For example, although the first direction and the second direction extend in directions perpendicular to each other, this embodiment is not limited thereto. However, the embodiment is not limited thereto. For example, an angle defined by the first direction and the second direction may be changed and applied to various angles and shapes according to a desired design.

Figure 2:
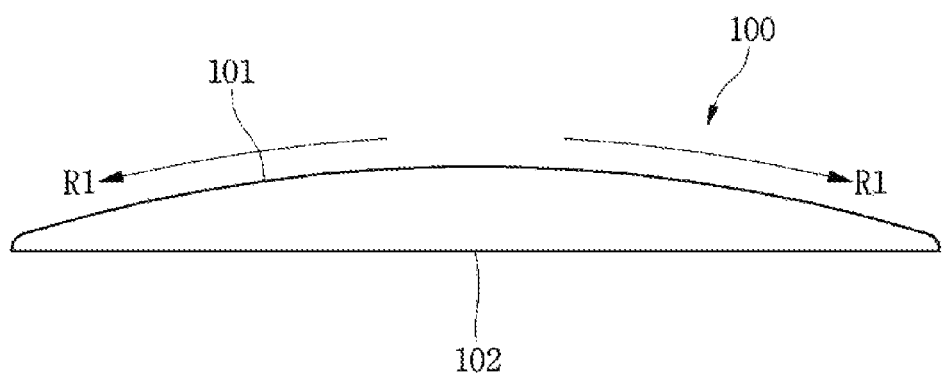
FIG. 2 is a cross-sectional view taken along line A-A' of FIG. 1.
Figure 3:
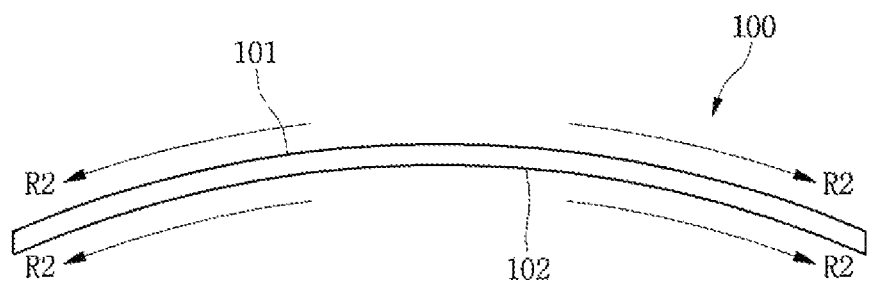
FIG. 3 is a cross-sectional view taken along line B-B' of FIG. 1.

FIGS. 2 and 3 are cross-sectional views taken along lines A-A' and B-B' of FIG. 1, respectively.

Referring to FIGS. 2 and 3, the one surface 101 may be bent in the first and second directions, and the other surface 102 may be bent in the first or second direction.

Referring to FIGS. 2 and 3, the one surface 101 may be bent in at least two directions. For example, the one surface 101 may be bent at the curvature R1 in the first direction and the curvature R2 in the second direction. That is, the one surface 101 may have a plurality of curved surfaces. The curvature R1 in the first direction may have a size of about 5 R to about 1,000 R. In detail, the curvature R1 in the first direction may have a size of about 30 R to about 1,000 R. In more detail, the curvature R1 in the first direction may have a size (mm) of about 500 R to about 1,000 R.

The one surface 101 may be bent in a generally convex direction. For example, the one surface 101 may have a generally convex curved surface. In detail, the one surface 101 may be bent in the first and second directions and have the generally convex curved surface.

When the curvature R1 in the first direction is less than about 5 R, the cover substrate may be excessively bent to cause cracks on the cover substrate. In addition, when the cover substrate is applied to the touch window, visibility may be deteriorated due to light scattering. Also, when the curvature R1 in the first direction exceeds about 1,000 R, the cover substrate may be closer to a plane to deteriorate an effect of the curved cover substrate.

The curvature R2 in the second direction may have a size (mm) of about 5 R to about 1,000 R. In detail, the curvature R2 in the second direction may have a size of about 30 R to about 1,000 R. In more detail, the curvature R2 in the second direction may have a size of about 500 R to about 1,000 R. The curvature R2 in the second direction may correspond to the curvature R2 in the first direction or be different from the curvature R2 in the first direction.

When the curvature R2 in the second direction is less than about 5 R, the cover substrate may be excessively bent to cause cracks on the cover substrate. In addition, when the cover substrate is applied to the touch window, the visibility may be deteriorated due to the light scattering. Also, when the curvature R1 in the first direction exceeds about 1,000 R, the cover substrate may be closer to a plane to deteriorate an effect of the curved cover substrate.

The curvature R1 in the first direction and the curvature R2 in the second direction may be equal or similar to each other in the above-described ranges or be different from each other.

Referring to FIGS. 2 and 3, the other surface 102 may have the curvature R1 in the first direction or the curvature R2 in the second direction. That is, the other surface 102 may have a single curved surface. That is, the other surface 102 may be bent in one direction. Here, the other surface 102 may be bent in one direction at the curvature R1 in the first direction or the curvature R2 in the second direction. Although the other surface is bent in the second direction in FIG. 3, this embodiment is not limited thereto. That is, the other surface may be bent in the first direction or be bent in a direction different from the first and second directions in which the one surface is bent.

That is, the other surface 102 may be bent in a direction corresponding to one direction of the directions in which the one surface 101 is bent.

The other surface 102 may be bent in a general convex direction. For example, the other surface 102 may have a general convex curved surface. In detail, the other surface 102 may be bent in the first direction or the second direction and have a generally convex curved surface.

This embodiment is not limited thereto. For example, all of the one surface 101 and the other surface 102 may be convex or concave. Alternatively, the one surface may be concave, and the other surface may be convex, or the one surface may be convex, and the other surface may be concave. That is, the one surface and the other surface may have various shapes.

Figure 4:
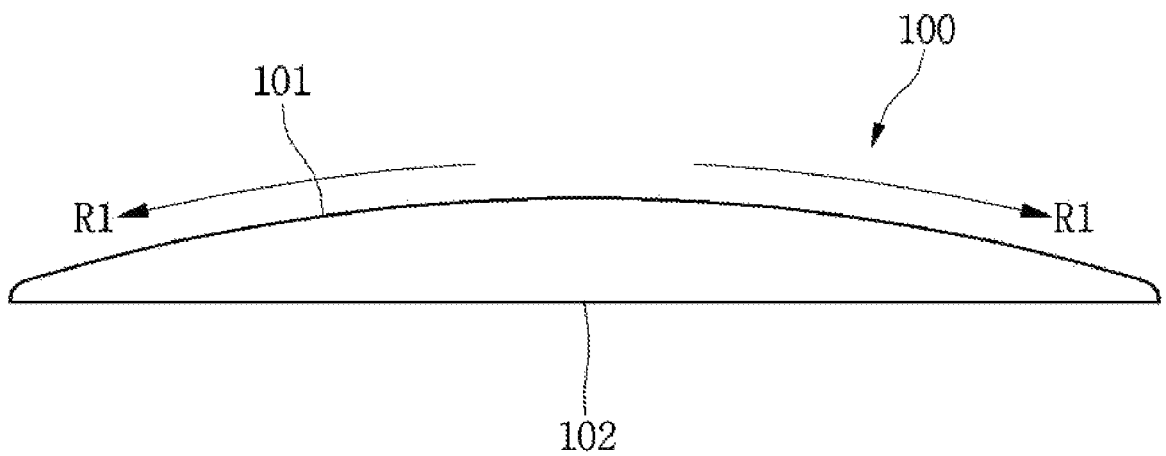
FIG. 4 is a cross-sectional view taken along line A-A' of FIG. 1.
Figure 5:
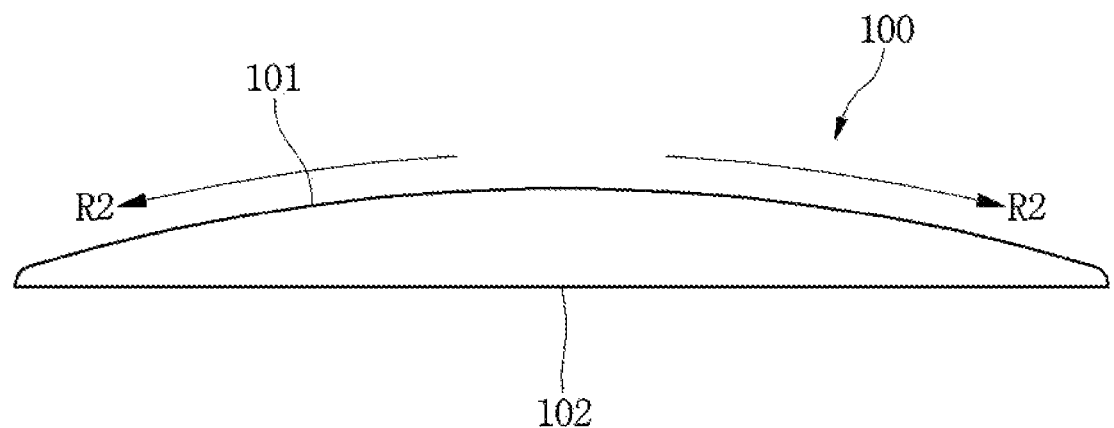
FIG. 5 is a cross-sectional view taken along line B-B' of FIG. 1.

FIGS. 4 and 5 are cross-sectional views taken along lines A-A' and B-B' of FIG. 1, respectively.

Referring to FIGS. 4 and 5, the one surface 101 of the cover substrate 100 may be bent in the first and second directions, and the other surface 102 may be flat. For example, in the cover substrate 100, only the one surface 101 may have a curved surface, and the other surface 102 may be flat. That is, the other surface 102 may have a curvature of zero.

Figure 6:
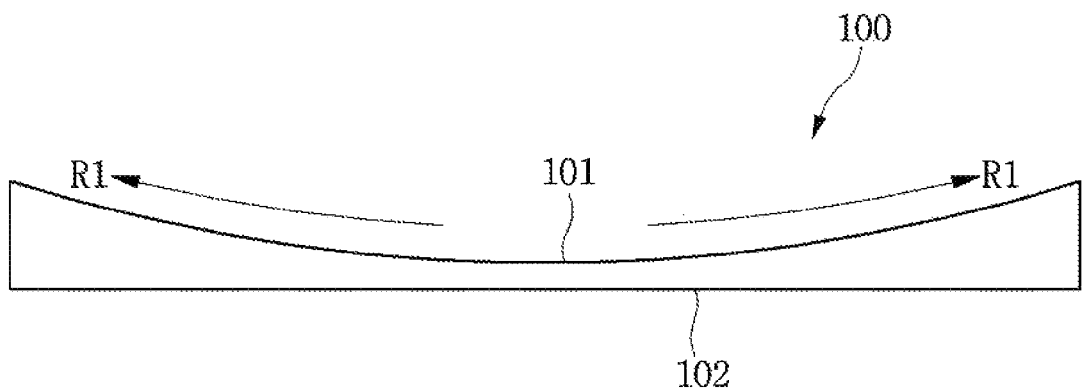
FIG. 6 is another cross-sectional view taken along line A-A' of FIG. 1.
Figure 7:
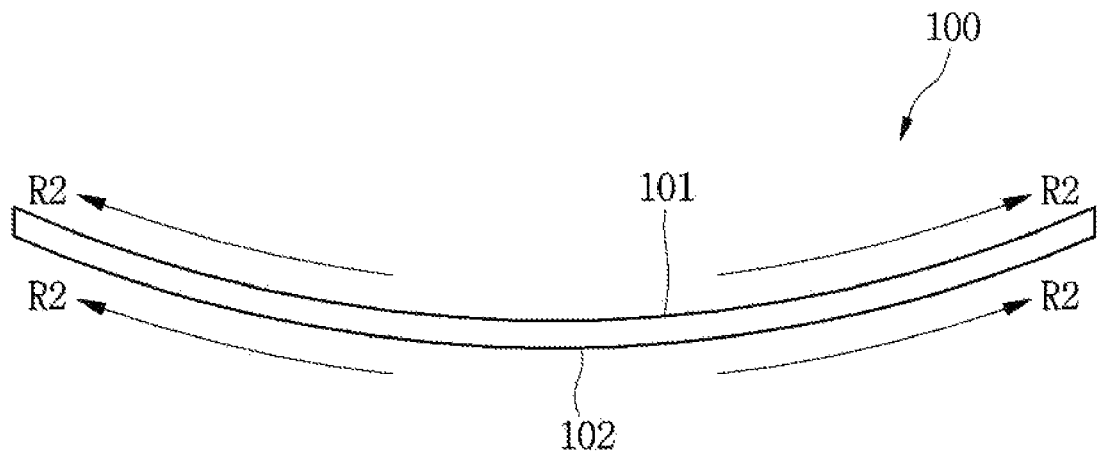
FIG. 7 is another cross-sectional view taken along line B-B' of FIG. 1.

FIGS. 6 and 7 are cross-sectional views taken along lines A-A' and B-B' of FIG. 1, respectively.

Referring to FIGS. 6 and 7, the one surface 101 of the cover substrate 100 may be bent in the first and second directions, and the other surface 102 may be bent in the first or second direction.

The one surface 101 may be bent in a generally concave direction. For example, the one surface 101 may have a general concave curved surface. In detail, the one surface 101 may be bent in the first and second directions and have a generally concave curved surface.

Also, the other surface 102 may be bent in a generally concave direction. For example, the other surface 102 may have a generally concave curved surface. In detail, the other surface 102 may be bent in the first or second direction and have a generally concave curved surface.

Although all of the one surface and the other surface are bent in the convex or concave direction in FIGS. 2 to 5, this embodiment is not limited thereto. For example, although this embodiment is not limited thereto, the one surface may have a concave curved surface, and the other surface may have the convex curved surface, or the one surface may have a convex curved surface, and the other surface may have a concave curved surface.

Hereinafter, a cover substrate according to another embodiment will be described with reference to FIGS. 8 to 10. In description of the cover substrate according to another embodiment, descriptions with respect to the constituents equal or similar to those of the cover substrate according to the foregoing embodiment will be omitted. Also, the same reference numerals are assigned to the same constituents.

Figure 8:
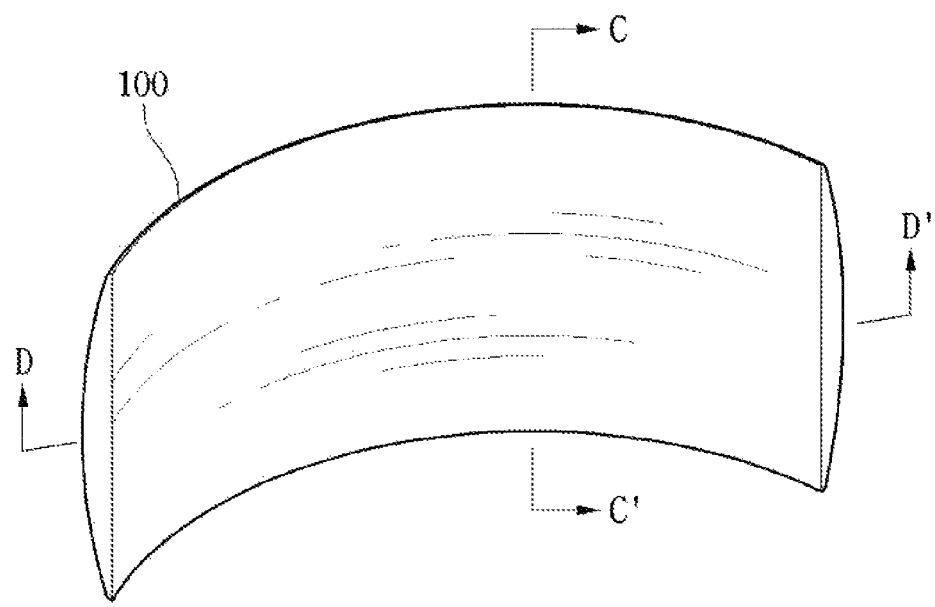
FIG. 8 is a perspective view of a cover substrate according to another embodiment.
Figure 9:
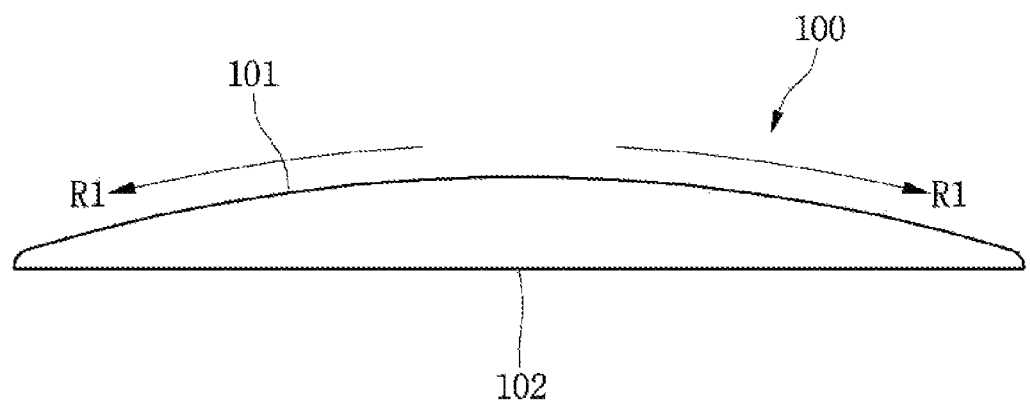
FIG. 9 is a cross-sectional view taken along line C-C' of FIG. 8.
Figure 10:
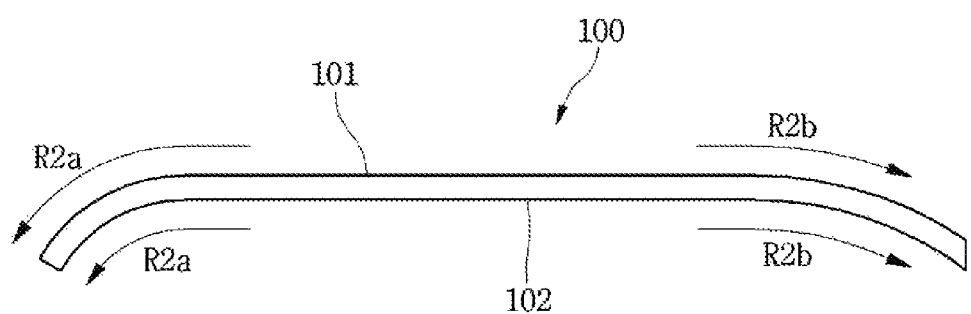
FIG. 10 is a cross-sectional view taken along line D-D' of FIG. 8.

Referring to FIGS. 8 to 10, a cover substrate according to another embodiment may include one surface 101 and the other surface 102, which have curved surfaces.

The one surface 101 may have curvatures in at least two directions. Also, the one surface 101 may have a curvature having at least one size. That is, the one surface 101 may be bent in at least two directions and have curvatures having at least one or more various sizes.

Referring to FIG. 9, the cover substrate 100 according to another embodiment may have one surface with a curvature that is bent in one direction, i.e., an R1 direction on one cross-section. Here, the cover substrate may have one end and the other end, which have the same curvature or curvatures similar to each other.

Referring to FIG. 10, the one surface and the other surface of the cover substrate 100 according to another embodiment may be bent at a plurality of curvatures on another cross-section.

For example, the cover substrate 100 may have one end that is bent to a size (mm) of R2a and the other end that is bent to a size (mm) of R2b. Here, the R2a and the R2b may have the same curvature direction and curvatures different from each other.

That is, the one surface 101 of the cover substrate 100 according to another embodiment may be bent in at least two directions, i.e., directions of R1, R2a, and R2b and have a plurality of curvatures, i.e., different curvatures of R1, R2, and R3.

Also, the other surface 102 of the cover substrate 100 may be bent in one direction, i.e., direction of R2a and R2b and have a plurality of curvatures, i.e., different curvatures of R2a and R3b.

Hereinafter, a cover substrate according to further another embodiment will be described in detail referring to FIGS. 11 and 13. In description of the cover substrate according to further another embodiment, descriptions with respect to the constituents equal or similar to those of the cover substrate according to the foregoing embodiments will be omitted. Also, the same reference numerals are assigned to the same constituents.

Figure 11:
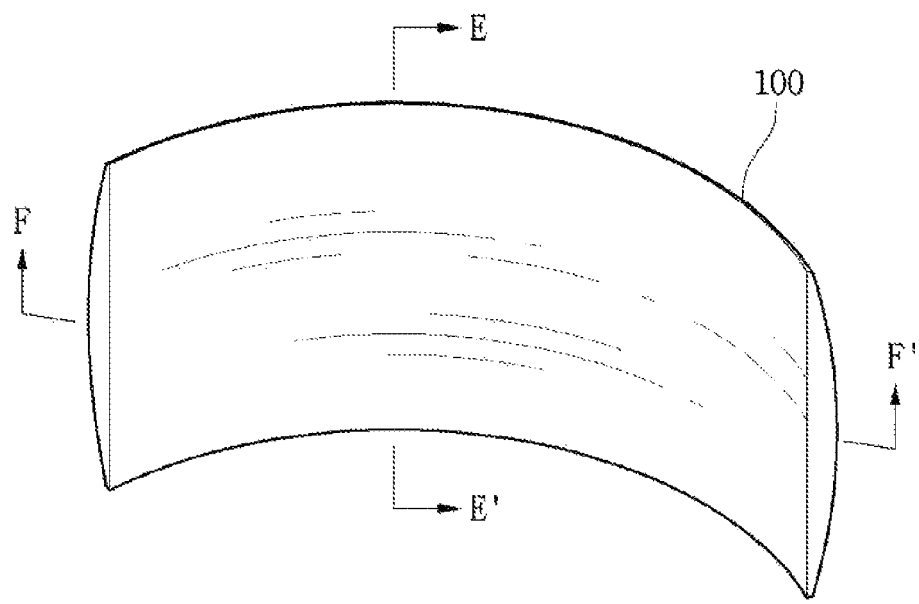
FIG. 11 is a perspective view of a cover substrate according to further another embodiment.
Figure 12:
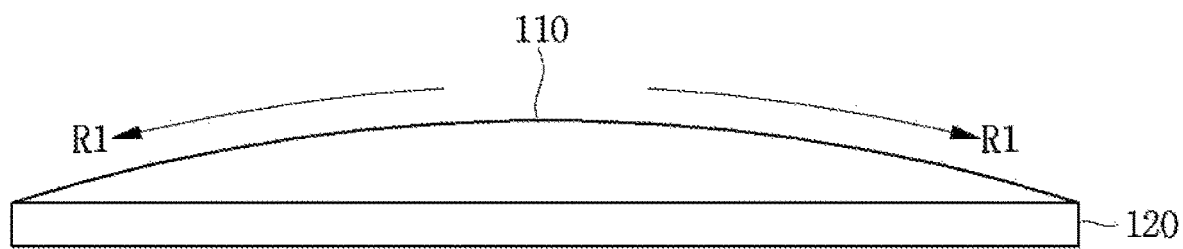
FIG. 12 is a cross-sectional view taken along line E-E' of FIG. 11.
Figure 13:
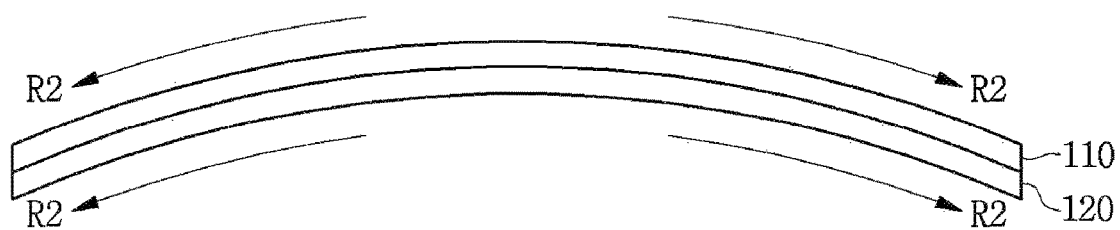
FIG. 13 is a cross-sectional view taken along line F-F' of FIG. 11.

Referring to FIGS. 11 to 13, a cover substrate 100 according to this embodiment may include at least two layers or more. For example, the cover substrate 100 according to this embodiment may include a first layer 110 and a second layer 120. However, this embodiment is not limited thereto. For example, the cover substrate 100 according to this embodiment may include a plurality of layers such as three layers, four layers, and the like.

The first layer 110 and the second layer 120 may include materials corresponding to each other, e.g., the same material. Alternatively, the first layer 110 and the second layer 120 may include materials different from each other.

Each of the first layer 110 and the second layer 120 may include plastic. For example, each of the first layer 110 and the second layer 120 may include at least one material of polyimide (PI), polyethylene terephthalate (PET), propylene glycol (PPG), polycarbonate (PC), cyclic olefin copolymer (COC), cyclic olefin polymer (COP), optically isotropic polycarbonate, PC), and optically isotropic polymethylmethacrylate (PMMA).

Preferably, each of the first layer 110 and the second layer 120 may include an optically isotropic film.

The first layer 110 and the second layer 120 may include the same material or different materials of the above-described materials. For example, the first layer 110 and the second layer 120 may include materials different from each other.

For example, the first layer 110 may include a material having large strength and impact resistance. In detail, the first layer 110 may include a material having strength and impact resistance, which are greater than those of the second layer 120.

Also, the second layer 120 may include a material having large ductility. In detail, the second layer 120 may include a material having ductility greater than that of the first layer 110.

Each of the first layer 110 and the second layer 120 may be bent. For example, one surface of the first layer 110 and one surface of the second layer 120 may be bent.

In detail, the first layer 110 may have one surface and the other surface opposite to the one surface and coming into contact with the second layer 120, and the one surface of the first layer 110 may be bent. Also, the second layer 120 may have one surface and the other surface opposite to the one surface and coming into contact with the first layer 110, and the other surface of the second layer 120 may be bent.

Referring to FIGS. 12 and 13, the one surface of the first layer 110 may be bent in at least two directions. For example, the one surface of the first layer 110 may be bent in a first direction and a second direction. Also, the one surface of the second layer 120 may be bent in one direction.

For example, the one surface of the second layer 120 may be bent in the first direction or the second direction.

That is, the one surface of the first layer 110 may have a plurality of curved surfaces that are bent in two directions, and the one surface of the second layer 120 may have a single curved surface that is bent in one direction.

However, this embodiment is not limited thereto. For example, all of the one surface of the first layer 110 and the one surface of the second layer 120 may have the plurality of curved surfaces.

Referring to FIGS. 12 and 13, the one surface of the first layer 110 may be bent at a curvature R1 in the first direction and a curvature R2 in the second direction. That is, the one surface of the first layer 110 may have the plurality of curved surfaces. The curvature R1 in the first direction may have a size of about 5 R to about 1,000 R. In detail, the curvature R1 in the first direction may have a size of about 30 R to about 1,000 R. In more detail, the curvature R1 in the first direction may have a size of about 500 R to about 1,000 R.

The one surface of the first layer 110 may be bent in a generally convex or concave direction. For example, the one surface of the first layer 110 may have a generally concave or convex curved surface. In detail, the one surface of the first layer 110 may be bent in the first direction and the second direction and have a generally concave or convex curved surface.

When the curvature R1 in the first direction is less than about 5 R, the cover substrate may be excessively bent to cause cracks on the cover substrate. In addition, when the cover substrate is applied to the touch window, visibility may be deteriorated due to light scattering. Also, when the curvature R1 in the first direction exceeds about 1,000 R, the cover substrate may be closer to a plane to deteriorate an effect of the curved cover substrate.

The curvature R2 in the second direction may have a size (mm) of about 5 R to about 1,000 R. In detail, the curvature R2 in the second direction may have a size of about 30 R to about 1,000 R. In more detail, the curvature dR2 in the second direction may have a size of about 500 R to about 1,000 R. The curvature R2 in the second direction may correspond to the curvature R2 in the first direction or be different from the curvature R2 in the first direction.

When the curvature R2 in the second direction is less than about 5 R, the cover substrate may be excessively bent to cause cracks on the cover substrate. In addition, when the cover substrate is applied to the touch window, the visibility may be deteriorated due to the light scattering. Also, when the curvature R1 in the first direction exceeds about 1,000 R, the cover substrate may be closer to a plane to deteriorate an effect of the curved cover substrate.

Referring to FIGS. 12 and 13, the one surface of the second layer 120 may be bent at the curvature R1 in the first direction or the curvature R2 in the second direction. That is, the one surface of the second layer 120 may have a single curved surface. The curvature R1 in the first direction or the curvature R2 in the second direction may have a size of about 5 R to about 1,000 R. In detail, the curvature R1 in the first direction or the curvature R2 in the second direction may have a size of about 30 R to about 1,000 R. In detail, the curvature R1 in the first direction or the curvature R2 in the second direction may have a size of about 500 R to about 1,000 R.

The one surface of the second layer 120 may be bent in a generally convex or concave direction. For example, the one surface of the second layer 120 may have a generally concave or convex curved surface. In detail, the one surface of the second layer 120 may be bent in the first direction or the second direction and have a generally concave or convex curved surface.

Although all of the one surface of the first layer 110 and the one surface of the second layer 120 have the curved surfaces in FIGS. 12 and 13, this embodiment is not limited thereto. For example, only the one surface of one of the first layer 110 and the second layer 120 may have the curved surface. For example, the one surface of the first layer 110 may have a plurality of curved surfaces that are bent in two directions, and the second layer 120 may have a curvature of zero, i.e., be a plane.

As described above, the first layer 110 may include the material having the large strength and impact resistance to prevent damage such as cracks from occurring in the first layer 110 while the first layer 110 is bent in the two directions. Also, since the second includes the material having the large ductility, when the first and second layers are bent, the second layer having the large ductility may serve as a buffer layer to prevent the cover substrate from being deformed due to the occurrence of the cracks.

In the cover substrate according to the embodiments, the one surface of the cover substrate or the one surface of the first layer may have the curved surface that is bent in the two directions, i.e., the plurality of curved surfaces, and the other surface of the cover substrate or the other surface of the second layer may have the curved surface that is bent in the one direction, i.e., the single curved surface.

Therefore, the cover substrate of which the one surface and the other surface have curved surfaces different from each other may be realized. That is, the cover substrate of which only the one surface is bent on the cross-section in one direction, and all of the one surface and the other surface are bent on the cross-section in the other direction may be realized.

Thus, when the cover substrate is applied to the display device or the touch device, a degree of freedom in design may be improved. That is, the cover substrate according to the embodiments may be easily coupled regardless of the position or the place at which the cover substrate is coupled. In addition, the degree of freedom in design may be improved by the configuration in which the one surface has the plurality of curved surfaces, and the other surface has the single curved surface.

Hereinafter, a method of manufacturing the cover substrate according to an embodiment will be described with reference to FIGS. 14 to 21.

Figure 14:
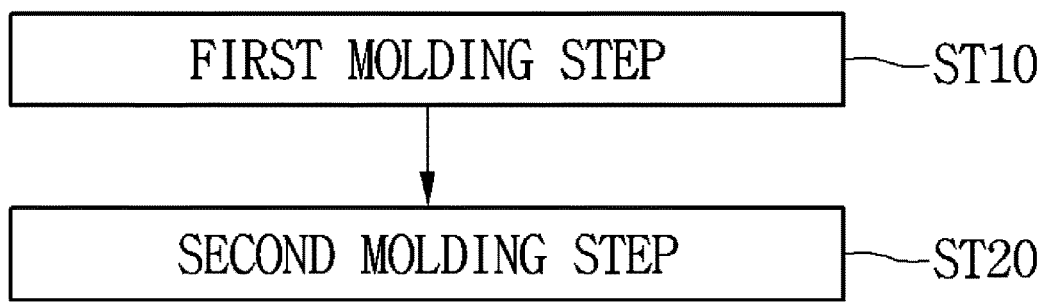
FIG. 14 is a flowchart illustrating a method for manufacturing a cover substrate according to an embodiment.

FIG. 14 is a view for explaining a method for manufacturing the cover substrate according to an embodiment.

Referring to FIG. 14, the method for manufacturing the cover substrate according to an embodiment may include a first molding step (ST10) and a second molding step (ST20).

The first molding step (ST10) and the second molding step (ST20) may be sequentially performed. Also, the first molding step (ST10) and the second molding step (ST20) may be continuously performed. Also, the first molding step (ST10) and the second molding step (ST20) may be performed as separate processes, respectively.

In the first molding step (ST10), a curved surface may be formed on at least one surface of one surface and the other surface of the cover substrate. For example, in the first molding step (ST10), a curved surface may be formed on one surface or the other surface of the substrate. That is, in the first molding step (ST10), the curved surface may be formed on one surface of the one surface and the other surface of the cover substrate.

In detail, in the first molding step (ST10), bending in a first direction may be formed on at least one surface of the one surface and the other surface of the cover substrate. For example, in the first molding step (ST10), the bending having a curvature may be formed on at least one surface of the one surface and the other surface of the cover substrate.

FIGS. 15 to 19 are views for explaining the first molding step (ST10).

Referring to FIGS. 15 to 19, in the first molding step (ST10), the cover substrate may be molded by using a plurality of molding members.

Figure 15:
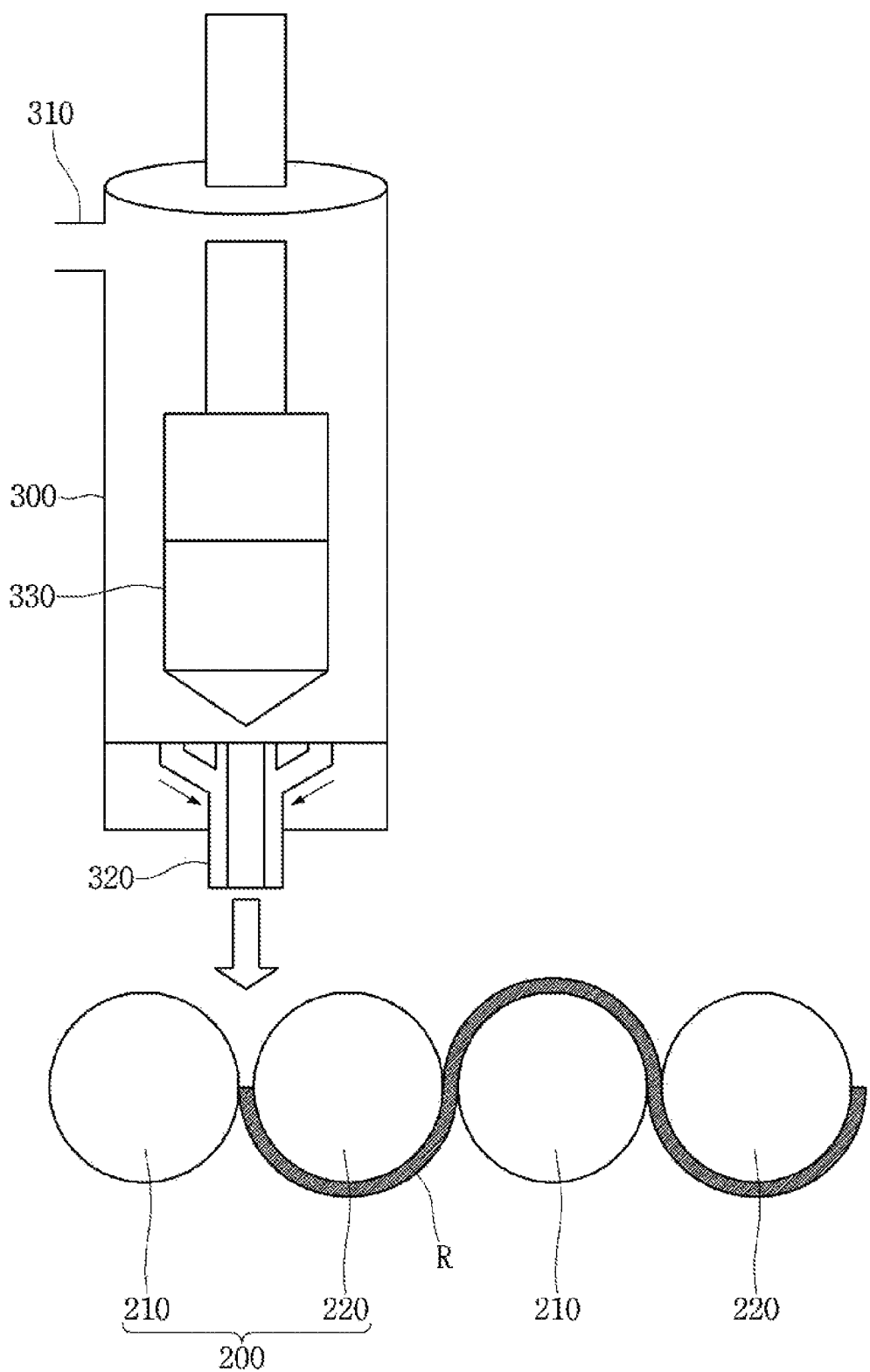
FIGS. 15 to 21 are views for explaining the method for manufacturing the cover substrate.

Referring to FIG. 15, a molding member 200 may include a first molding member 210 and a second molding member 220. Each of the first molding member 210 and the second molding member 220 may include a metal.

At least one or more of the first molding member 210 and the second molding member 220 may be provided. For example, each of the first molding member 210 and the second molding member 220 may be provided in plurality. The plurality of first and second molding members 210 and 220 may be alternately disposed.

The first molding member 210 and the second molding member 220 may face each other. Also, the first molding member 210 and the second molding member 220 may be disposed to be spaced apart from each other. For example, the first molding member 210 and the second molding member 220 may be spaced apart from each other and disposed to face each other.

Referring to FIG. 15, a resin may be injected between the first molding member 210 and the second molding member 220. The resin may pass between the first molding member 210 and the second molding member 220. For example, a resin material R may pass between the first molding member 210 and the second molding member 220, which are disposed to be spaced apart from each other and disposed to face each other. Thus, a first molded substrate may be manufactured.

The resin material R may flow into a chamber 300 through an injection part 310 and then be mixed by a mixing member 330 in the chamber 300 to move to the molding member through a discharge part 320. Here, a discharge amount and a temperature of the resin material R may be controlled to a desired amount and temperature in the chamber.

The resin material may include at least one resin material. For example, the resin material R may include one resin material or a mixture in which two or more resin materials are mixed with each other. In detail, the resin material R may include at least one material of polyimide (PI), polyethylene terephthalate (PET), propylene glycol (PPG), polycarbonate (PC), cyclic olefin copolymer (COC), cyclic olefin polymer (COP), optically isotropic polycarbonate, PC), and optically isotropic polymethylmethacrylate (PMMA).

However, this embodiment is not limited thereto. For example, a silica-based material forming glass instead of the resin material may be injected to pass between the first molding member 210 and the second molding member 220. For example, a silica-based material forming glass such as soda lime glass or aluminosilicate glass may be injected to pass between the first molding member 210 and the second molding member 220.

Although four first and second molding members 210 and 220 are provided in FIG. 15, this embodiment is not limited thereto. For example, four or more molding members may be provided.

Each of the first molding member 210 and the second molding member 220 may have a curved surface. For example, each of the first and second molding members 210 and 220 may have a general circular shape. In detail, each of the first molding member 210 and the second molding member 220 may have a cylindrical shape.

Also, one molding member of the first molding member 210 and the second molding member 220 may have a convex portion or a concave portion. That is, the first molding member 210 or the second molding member 220 may include a convex portion or a concave portion.

Figure 16:
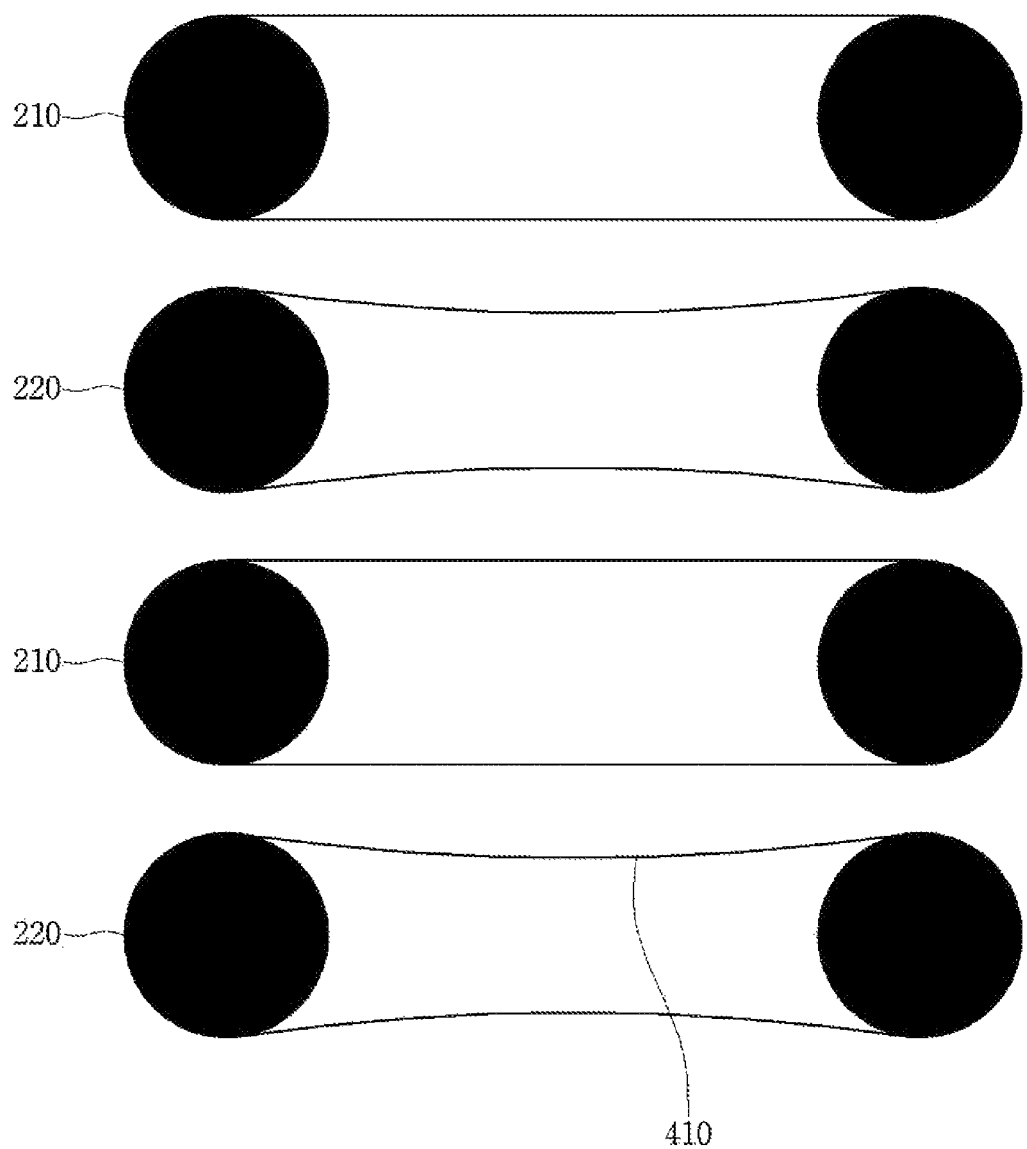

Referring to FIG. 16, the second molding member 220 may include a concave portion 410. For example, the second molding member 220 may have the concave portion on one surface thereof facing the first molding member 210. Here, the concave portion may be a portion that is recessed from one surface of the first molding member facing the second molding member 220.

When the resin material R passes between the first and second molding members 210 and 220 of FIG. 16, the first molded substrate may be manufactured, and a curved surface may be formed on one surface of the first molded substrate. That is, when passing between the first and second molding members 210 and 220, a curved surface having a concave shape corresponding to the shape of the concave portion may be formed on one surface of the first molded substrate passing through the portion on which the concave portion 410 is formed.

Figure 17:
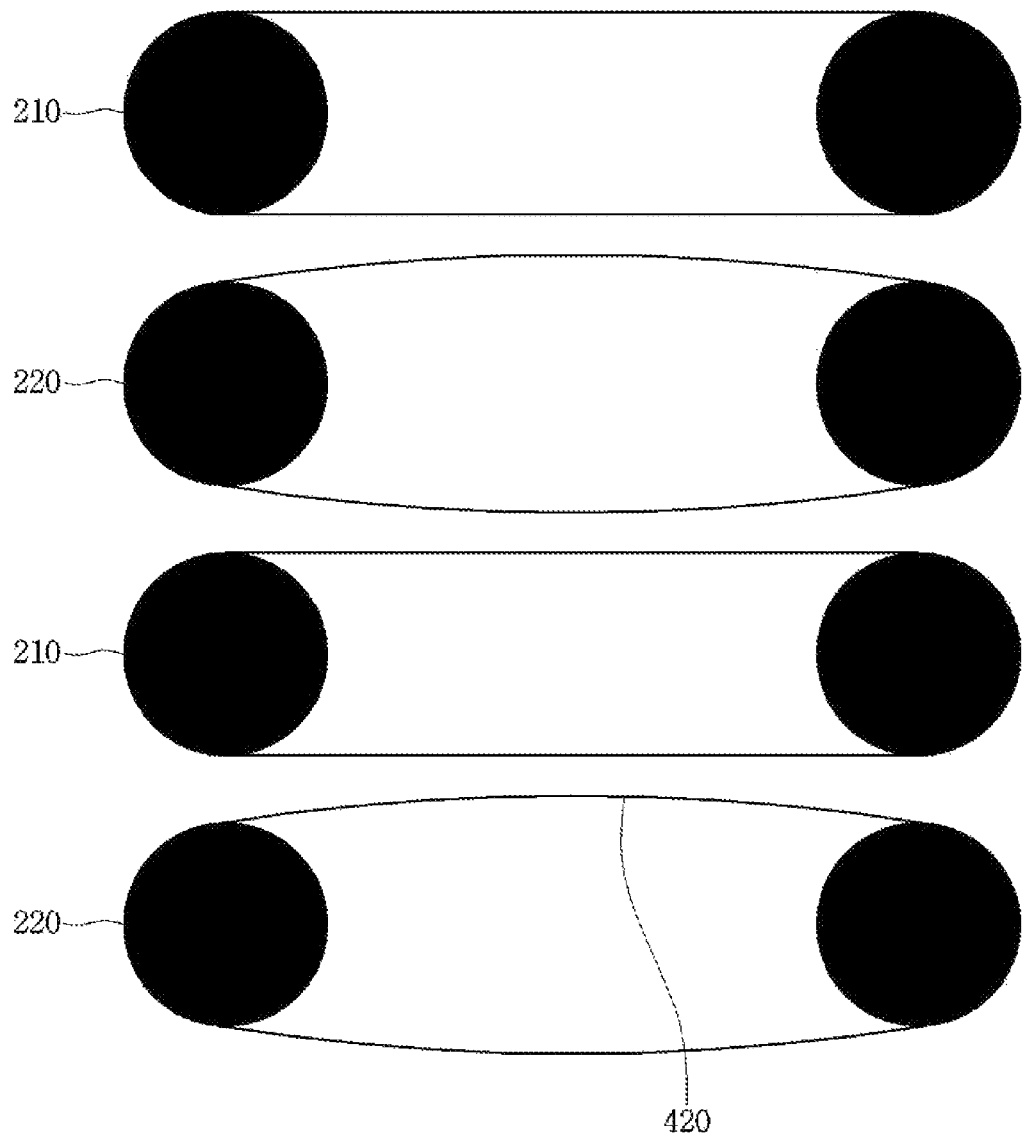

Referring to FIG. 17, the second molding member 220 may include a convex portion 420. For example, the second molding member 220 may include a convex portion on one surface thereof facing the first molding member 210. Here, the convex portion may be a portion that protrudes from one surface of the first molding member facing the second molding member 220.

When the resin material R passes between the first and second molding members 210 and 220 of FIG. 17, the first molded substrate may be manufactured, and a curved surface may be formed on one surface of the first molded substrate. That is, when passing between the first and second molding members 210 and 220, a curved surface having a convex shape corresponding to the shape of the convex portion may be formed on one surface of the first molded substrate passing through the portion on which the convex portion 420 is formed.

Figure 18:
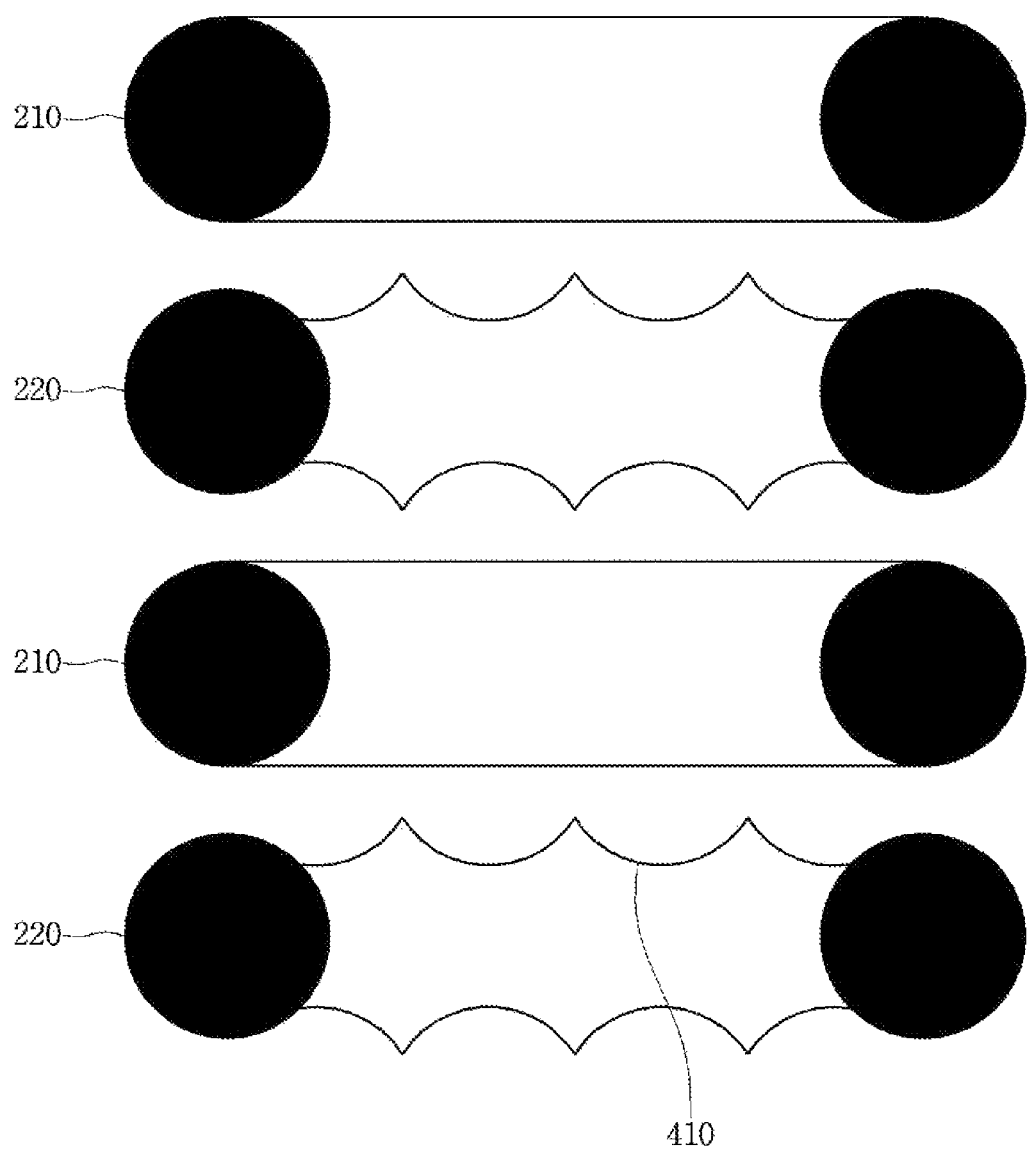

Referring to FIG. 18, the second molding member 220 may include a plurality of concave portions 410. For example, the second molding member 220 may include a plurality of concave portions on one surface thereof facing the first molding member 210. Here, the concave portion may be a portion that is recessed from one surface of the first molding member facing the second molding member 220.

When the resin material R passes between the first and second molding members 210 and 220 of FIG. 18, the first molded substrate may be manufactured, and a plurality of curved surfaces may be formed on one surface of the first molded substrate. That is, when passing between the first and second molding members 210 and 220, curved surfaces each of which has a concave shape corresponding to the shape of each of the concave portions may be formed on one surface of the first molded substrate passing through the portion on which the concave portions 410 are formed.

Figure 19:
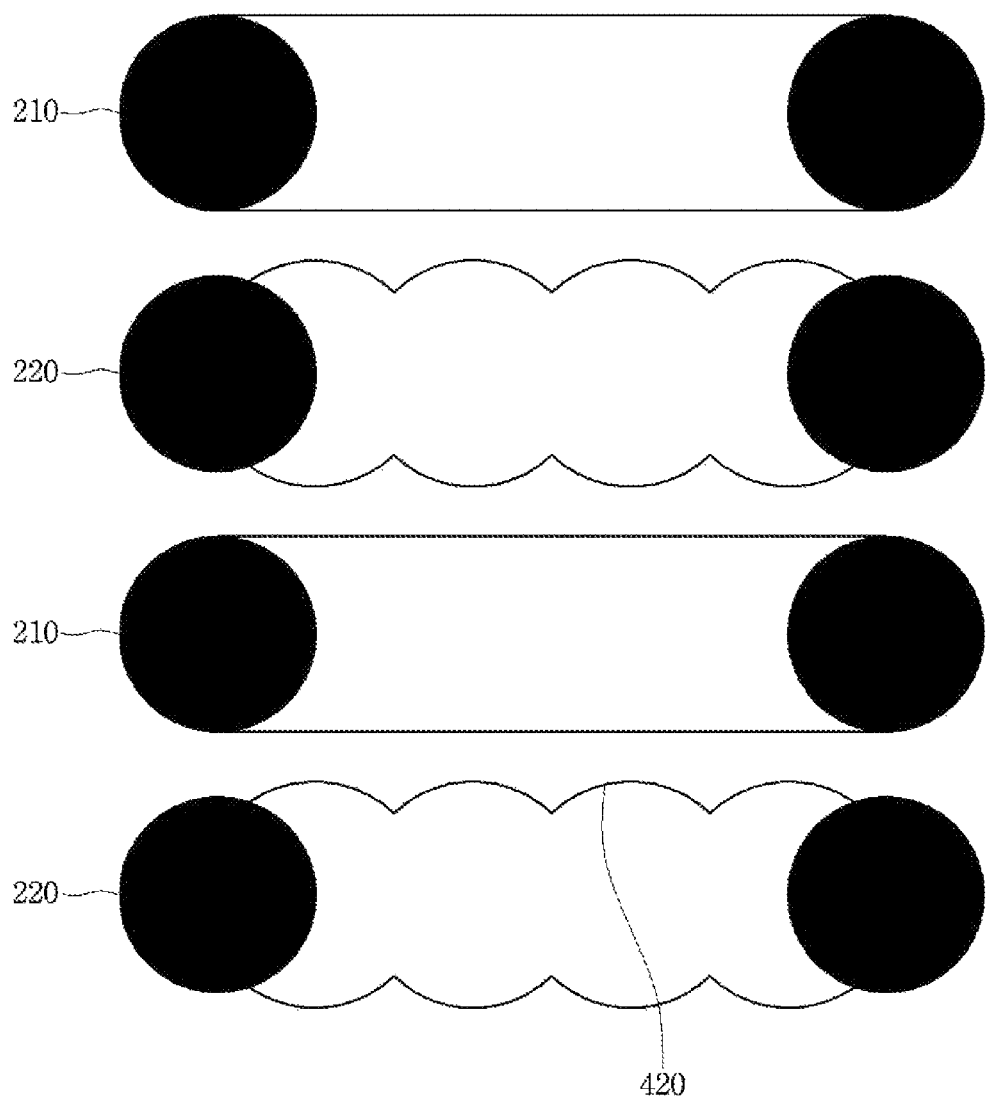

Referring to FIG. 19, the second molding member 220 may include a plurality of convex portions 420. For example, the second molding member 220 may include a plurality of convex portions on one surface thereof facing the first molding member 210. Here, the convex portion may be a portion that protrudes from one surface of the first molding member facing the second molding member 220.

When the resin material R passes between the first and second molding members 210 and 220 of FIG. 19, the first molded substrate may be manufactured, and a plurality of curved surfaces may be formed on one surface of the first molded substrate. That is, when passing between the first and second molding members 210 and 220, curved surfaces each of which has a convex shape corresponding to the shape of each of the convex portions may be formed on one surface of the first molded substrate passing through the portion on which the convex portions 420 are formed.

As described above, in the first molding step (ST10), a first molded substrate 100a having one surface on which a curved surface is formed may be manufactured by using the plurality of molding members.

Figure 20:
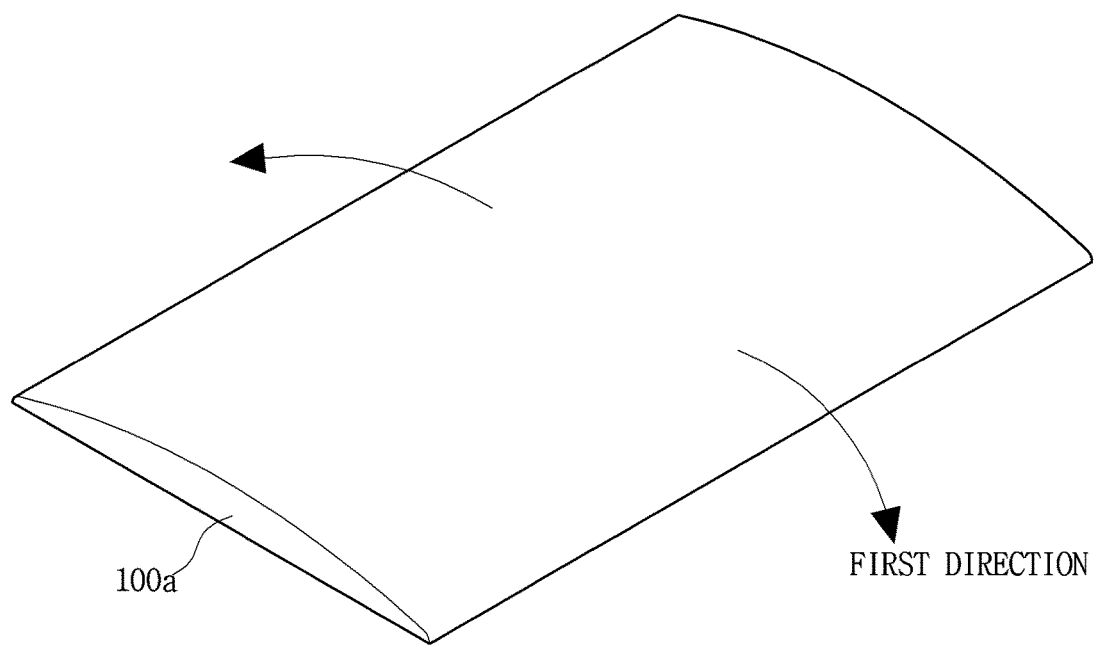

Referring to FIG. 20, in the first molding step, the first molded substrate 100a that is bent in the first direction may be manufactured. That is, a curved surface that is bent in the first direction may be formed on one surface of one surface and the other surface of the first molded substrate 100a.

That is, the resin material passing between the molding members may be formed as the curved surface having a predetermined curvature on the one surface or the other surface of the substrate by the concave portion or the convex portion formed on the second molding member to form the first molded substrate 100a.

Figure 21:
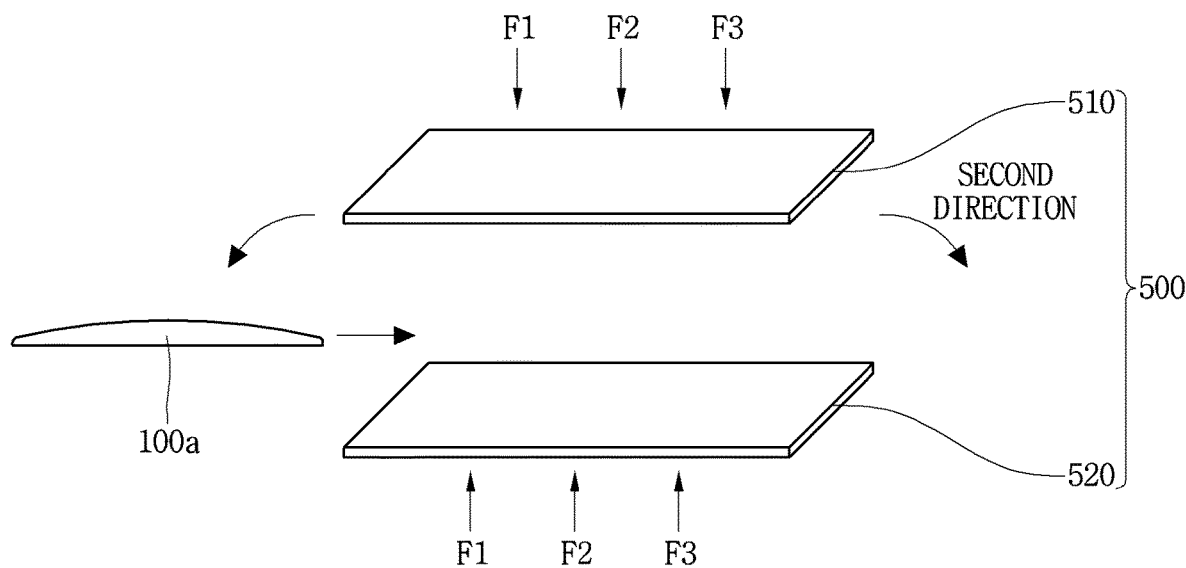

FIG. 21 is a view for explaining a second molding step.

Referring to FIG. 18, a mold member 500 may be prepared. A first molded substrate may be disposed in the mold member, and then, the mold member may be bent in the second direction.

For example, the mold member 500 may include a first substrate 510 and a second substrate 520. The first molded substrate may be disposed between the first substrate 510 and the second substrate 520, and then, the mold member may be bent in the second direction. Here, the mold member may be bent by high-temperature heat.

When the mold member is manufactured in the same shape as the first molded substrate and then bent in the second direction, defects occurring when bent in the second direction may be reduced. Here, the mold member may be bent while maintaining the curved shape formed in the first molding step even though directionality in the second direction varies.

Thus, the curved surface in the second direction may be formed on the one surface and the other surface of the first molded substrate. That is, the curved surface in the second direction may be formed on all of the one surface and the other surface of the first molded substrate.

When bent in the second direction, bending of respective operating points, i.e., F1, F2, and F3 may be performed at different curvatures by changing heat, a temperature, and a pressure, which are required for the bending. Thus, in the second molding step, the cover substrate having a plurality of curvatures may be formed. The second direction may be different from the first direction. For example, the first direction may be perpendicular to the second direction. However, this embodiment is not limited thereto. For example, the first direction and the second direction may extend at an obtuse angle or an acute angle therebetween.

In the second molding step, the one surface of the first molded substrate may be bent in two directions, i.e., the first direction and the second direction, and the other surface of the first molded substrate may be bent in one direction, i.e., the second direction.

Thus, the finally manufactured substrate may have one surface on which a plurality of curved surfaces having curvatures in the two directions are formed and the other surface on which a single curved surface having a curvature in one direction is formed.

Also, the curved surfaces of the one surface and the other surface may vary in direction or size to form a plurality of curved surfaces having different shapes on the one surface and the other surfaces.

The curved surface that is bent in the first direction and the curved surface that is bent in the second direction may have a curvature size (mm) of about 5 R to about 1,000 R.

When the curvature is less than about 5 R, the substrate may be excessively bent to cause cracks on the cover substrate. In addition, when the substrate is applied to the touch window, visibility may be deteriorated due to light scattering. Also, when the curvature exceeds about 1,000 R, the substrate may be closer to a plane to deteriorate an effect of the curved substrate.

Also, the bending in the first direction and the bending in the second direction may be performed to have sizes corresponding to each other within the curvature range or have different curvatures.

Although the substrate manufacturing method using an extrusion process is described in FIGS. 13 to 21, this embodiment is not limited thereto. For example, the substrate may be manufactured through injection molding by using various molds having desired shapes.

Hereinafter, a touch window including the cover substrate according to an embodiment will be described with reference to FIGS. 22 and 23.

Figure 22:
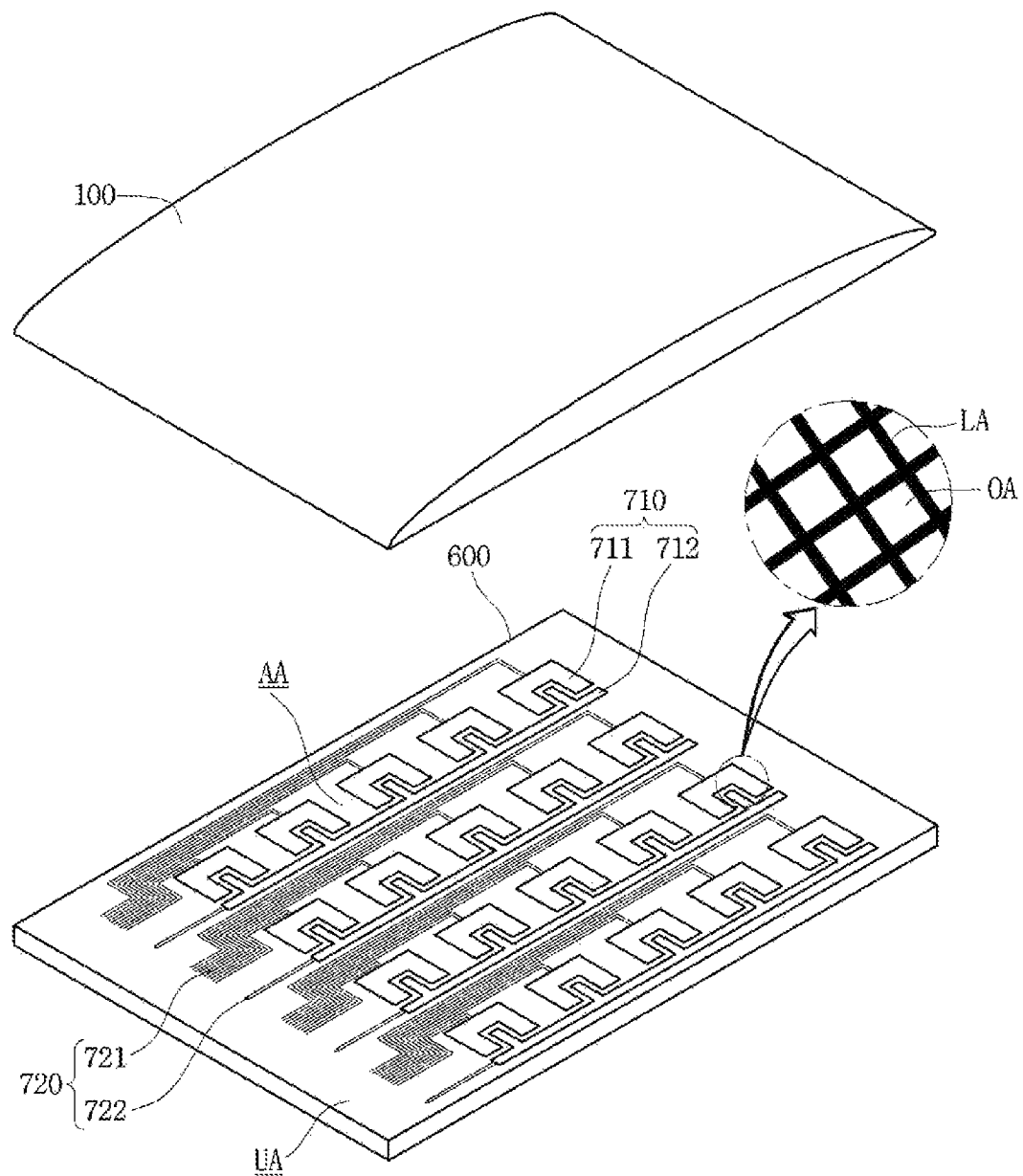
FIG. 22 is a perspective view of a touch window including the cover substrate according to an embodiment.

Referring to FIG. 22, a touch window according to an embodiment may include a cover substrate 100, a substrate 600, and an electrode.

For example, the touch window according to an embodiment may include the cover substrate 100, the substrate 600 on the cover substrate 100, and the electrode on the substrate 600.

The cover substrate 100 and the substrate 600 may adhere to each other through an optical clear adhesive. For example, the cover substrate 100 and the substrate 600 may adhere to each other through an adhesive such as OCA or OCR.

The substrate 600 may include the same material as the cover substrate 100 or include a material similar to that of the cover substrate 100. Also, at least one surface of one surface and the other surface of the substrate 600 may have a curved surface like the cover substrate 100. For example, the substrate 600 may have a shape corresponding to that of the cover substrate 100. That is, the one surface of the substrate 600 may have a plurality of curved surfaces, and the other surface may have a single curved surface.

The cover substrate 100 and the substrate 600 may be defined as an available area AA and a non-available area UA.

A display may be disposed on the available area AA and may not be displayed on the non-available area UA disposed around the available area AA.

Also, a position of an input device (for example, a finger, a stylus pen, and the like) may be sensed on at least one area of the available area AA and the non-available area UA. When the input device such as the finger comes into contact with the touch window, a difference in capacitance may occur at the contact portion of the input device, and thus, a portion at which the difference in capacitance occurs may be detected as the contact position.

The electrodes may be disposed on the substrate 600. For example, a sensing electrode 710 and a wired electrode 720 may be disposed on the substrate 600.

The sensing electrode 710 may be disposed on the available area AA.

The sensing electrode 710 may include a transparent conductive material so that electricity flows without blocking light transmission. For example, the sensing electrode 710 may include metal oxide such as indium tin oxide, indium zinc oxide, copper oxide, tin oxide, zinc oxide, and titanium oxide.

Alternatively, the sensing electrode 710 may include a nanowire, a photosensitive nanowire film, a carbon nanotube (CNT), a graphene, a conductive polymer, or a mixture thereof. When a nano-composite such as the nanowire or the carbon nanotube (CNT) is used, the sensing electrode 710 may have a black color. Thus, there is an advantage of controlling a color and reflectance while securing electric conductivity by controlling a content of nano powder.

Alternatively, the sensing electrode 710 may include various metals. For example, the sensing electrode 710 may include at least one metal of chromium (Cr), nickel (Ni), copper (Cu), aluminum (Al), silver (Ag), molybdenum (Mo), gold (Au), titanium, and an alloy thereof.

Also, the sensing electrode 710 may have a mesh shape. In detail, the sensing electrode 710 may include a plurality of sub electrodes. The sub electrodes may be disposed to cross each other in the mesh shape.

In detail, the sensing electrode may include a mesh opening OA between mesh lines LA by the plurality of sub electrodes crossing each other in the mesh shape.

Each of the mesh lines LA may have a line width of about 0.1 µm to about 10 µm. When the mesh line LA has a line width less than about 0.1 µm or less, a mesh line portion may not be formed in manufacturing process, or a short-circuit of the mesh line may occur. When the mesh line LA has a line width greater than about 10 µm, an electrode pattern may be visually recognized from the outside to deteriorate visibility. Preferably, the mesh line LA may have a line width of about 0.5 µm to about 7 µm. More preferably, the mesh line LA may have a line width of about 1 µm to about 3.5 µm.

Also, the mesh opening may have various shapes. For example, the mesh opening OA may have various shapes such as a rectangular shape, a diamond shape, a pentagonal shape, a hexagonal polygonal shape, a circular shape, and the like. Also, the mesh opening may be formed in a regular shape or a random shape.

Since the sensing electrode has the mesh shape, the pattern of the sensing electrode may be invisible on the available area, for example, the display area. That is, even if the sensing electrode is made of a metal, the pattern may be invisible. Also, resistance of the touch window may be reduced even if the sensing electrode is applied to a touch window having a large size.

The sensing electrode 710 may include a first sensing electrode 711 and a second sensing electrode 712.

The first sensing electrode 711 and the second sensing electrode 712 may be disposed to be spaced apart from each other. For example, the first sensing electrode 711 may be disposed to extend in one direction, and the second sensing electrode 712 may be disposed to extend in a direction different from the one direction. The first sensing electrode 711 and the second sensing electrode 712 may be disposed to be spaced apart from each other.

The wired electrode 720 may be disposed on the available area AA and the non-available area UA.

The wired electrode may include a first wired electrode 721 connected to the first sensing electrode 711 and a second wired electrode 722 connected to the second sensing electrode 712.

The first wired electrode 721 and the second wired electrode 722 may be respectively connected to the first sensing electrode 711 and the second sensing electrode 712 on the available area AA to extend to the non-available area and be disposed to be connected to a printed circuit board on the non-available area UA.

The wired electrode 720 may include a conductive material. For example, the wired electrode 720 may include a material that is equal or similar to that of the sensing electrode 710 described above. Also, the wired electrode 720 may have a mesh shape like the sensing electrode.

In the touch window according to an embodiment, all of the first and second sensing electrodes may be disposed on the substrate to reduce a thickness of the touch window. Also, the electrodes may be disposed on the substrate rather than the cover substrate to prevent the cover substrate from being damaged when the electrode is disposed.

Figure 23:
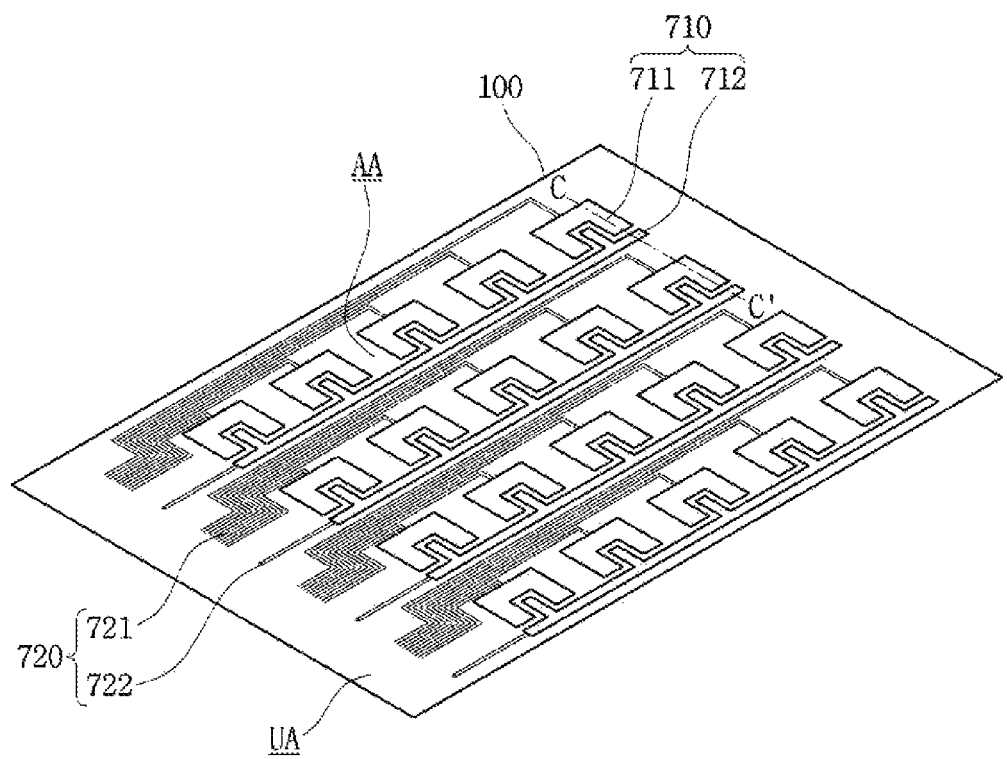
FIG. 23 is another perspective view of the touch window including the cover substrate according to an embodiment.

Referring to FIG. 23, in the touch window according to an embodiment, the substrate may be omitted, and the electrode may be directly disposed on the cover substrate 100.

In detail, the sensing electrode and the wired electrode may be disposed on the cover substrate 100. Since materials, arrangement positions, and shapes of the sensing electrode and the wired electrode are the same as those described above, their descriptions will be omitted.

In the touch window according to an embodiment, since the sensing electrode and the wired electrode are directly disposed on the cover substrate, the disposition of the substrate may be omitted. Thus, the touch window may be reduced in thickness to realize the touch window having a slim thickness.

Hereinafter, a touch device in which the touch window in which the cover substrate according to an embodiment and a display panel are coupled to each other will be described with reference to FIGS. 24 to 26.

Figure 24:
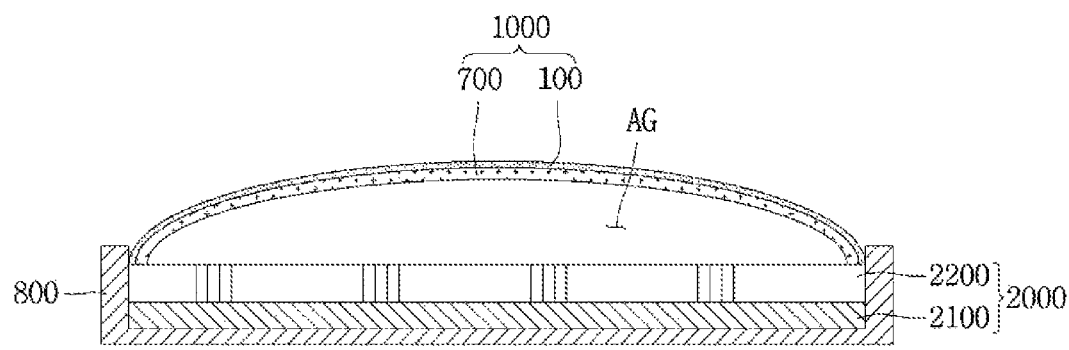
FIGS. 24 to 26 are views of various types of touch devices in which the touch window including the cover substrate and a display panel are coupled to each other according to an embodiment.

Referring to FIG. 24, the touch device according to an embodiment may include a cover case 800, a touch window 1000 accommodated in the cover case 800, and a display panel 2000.

In detail, the display panel 2000 may be disposed in the cover case 800, and the touch window 1000 having a curved surface may be disposed on the display panel 2000.

The cover case 800 may include a metal or plastic.

Although the cover case 800 is shown at a right angle for convenience of description in drawings, this embodiment is not limited thereto. For example, the cover case 800 may have a curved surface if the cover case 800 is used in a vehicle.

The touch window 1000 may include the above-described cover substrate 100 and an electrode 700 on the cover substrate.

The display panel 2000 may include a light module 2100 and a liquid crystal panel 2200. The light module 2100 may include a light source that emits light to the liquid crystal panel 2200. For example, the light source may include a light emitting diode (LED) or an organic light emitting diode (OLED).

The liquid crystal panel 2200 may include a plurality of liquid crystal elements. The liquid crystal elements may be changed in internal arrangement of molecules according to an electrical signal applied from the outside to provide directionality in predetermined pattern.

In the display panel 2000, light emitted from the light module 2100 may be refracted to different patterns while passing through the liquid crystal panel 2200.

Also, although not shown, the display panel 2000 may further include a polarizing filter and a color filter disposed on the liquid crystal panel 2200.

That is, the display panel 2000, which does not have a curved surface, i.e., is provided as a plane and the touch window 1000 disposed on the display panel 2000 and having a curved surface by applying the above-described cover substrate may be disposed in the cover case 800.

Thus, a pore may be formed between the touch window 1000 and the display panel 2000.

Figure 25:
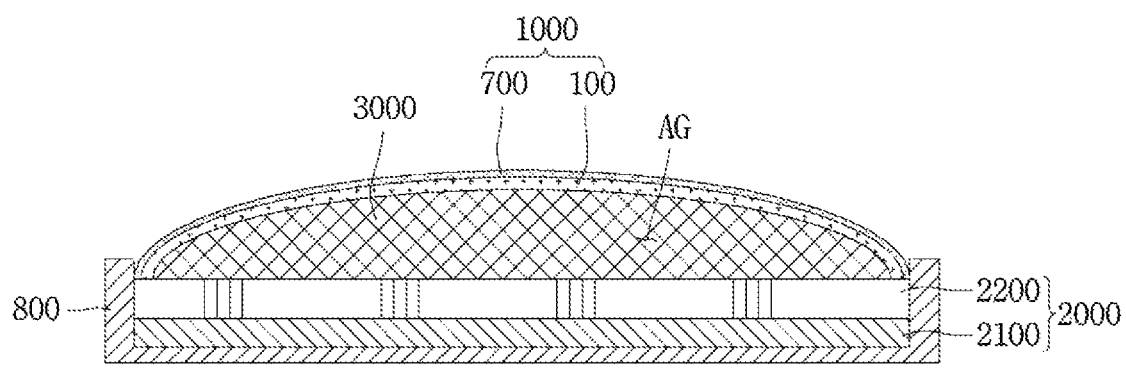

Referring to FIG. 25, the touch device according to an embodiment may include a cover case 800, a touch window 1000 accommodated in the cover case 800, and a display panel 2000.

In detail, the display panel 2000 may be disposed in the cover case 800, and the touch window 1000 having a curved surface may be disposed on the display panel 2000.

That is, the display panel 2000, which does not have a curved surface, i.e., is provided as a plane and the touch window 1000 disposed on the display panel 2000 and having a curved surface by applying the above-described cover substrate may be disposed in the cover case 800.

Thus, a pore part AG may be formed between the touch window 1000 and the display panel 2000.

A reinforcing member 3000 may be disposed in the pore. That is, the reinforcing member 3000 filling the pore part may be disposed in the pore.

The reinforcing member 3000 may be transparent. For example, at least one layer of an air layer, an adhesion layer, and a plastic layer may be disposed on the reinforcing member 3000. In detail, the reinforcing member 3000 may include an air layer such as air, an optical clear resin (OCA), a photosensitive resin, a resin layer such as polymethylmethacrylate (PMMA) and polycarbonate, and an adhesion layer such as an optical clear adhesive (OCA).

The reinforcing member may be disposed to fill the pore part AG. Here, the inside of the pore part AG may be completely filled with the reinforcing member 3000. Thus, the reinforcing member 3000 may be disposed to come into contact with the touch window 1000 and the display panel 2000.

Therefore, external foreign substances introduced through the pore part may be blocked by the reinforcing member to improve reliability of the touch device.

Figure 26:
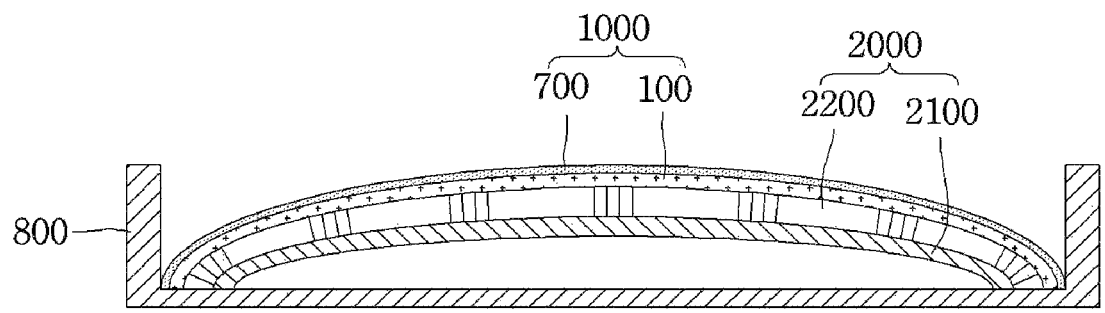

Referring to FIG. 26, the touch device according to an embodiment may include a cover case 800, a touch window 1000 accommodated in the cover case 800, and a display panel 2000.

In detail, the display panel 2000 having a curved surface may be disposed in the cover case 800, and the touch window 1000 having a curved surface may be disposed on the display panel 2000. That is, each of the touch window 1000 and the display panel 2000 may have the curved surface.

Although each of the touch window 1000 and the display panel has the curved surface in a convex direction with respect to one surface of the cover case in FIG. 23, this embodiment is not limited thereto. Each of the touch window 1000 and the display panel has the curved surface in a concave direction.

Thus, the formation of the pore part between the touch window and the display panel may be prevented to block the external foreign substances that may be introduced through the pore part, through the reinforcing member, thereby improving the reliability of the touch device.

Hereinafter, an example of the touch device to which the substrate is applied according to the foregoing embodiments will be described with reference to FIGS. 27 to 28.

Figure 27:
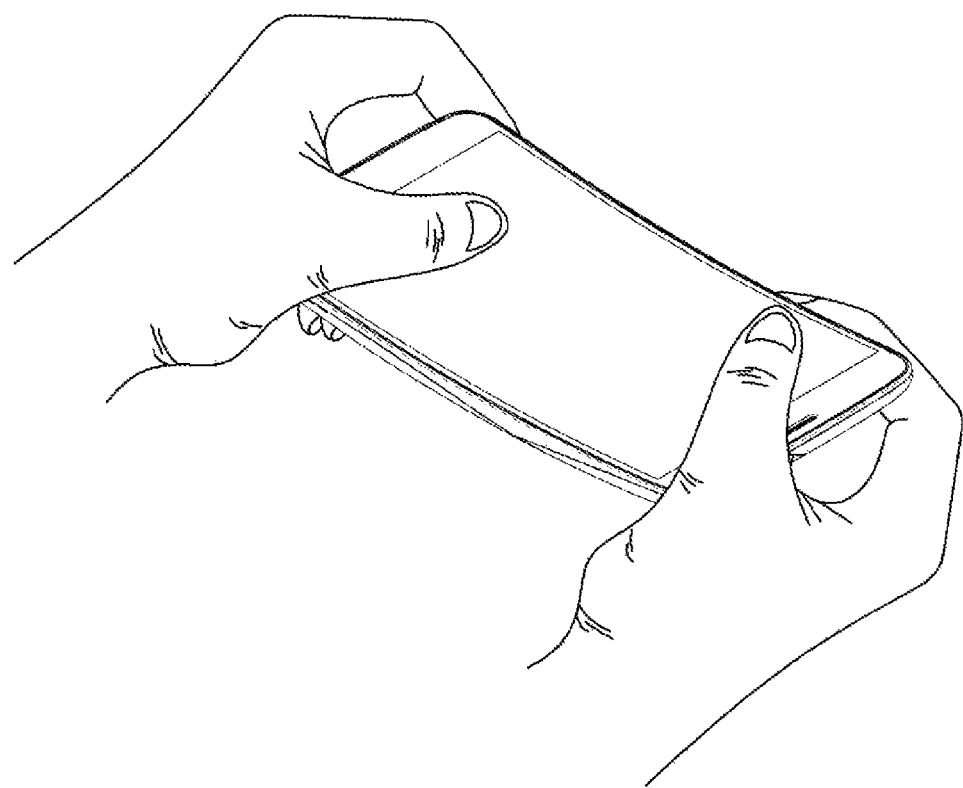
FIGS. 27 and 28 are views of a touch device to which the touch device including the cover substrate is applied according to an embodiment.

Referring to FIG. 27, the cover substrate may be applied to a car navigation system as well as the touch device such as a mobile terminal.

Figure 28:
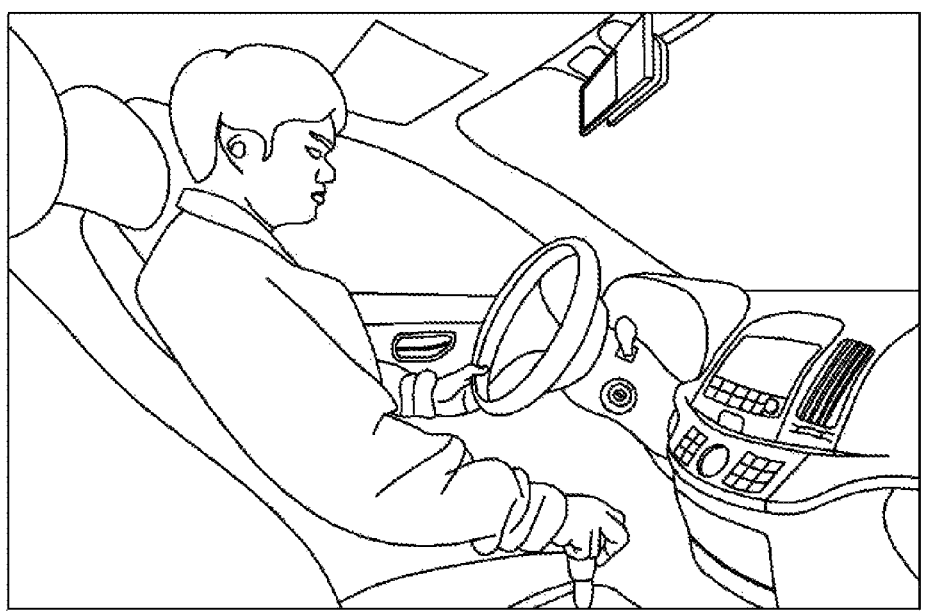

Also, referring to FIG. 28, the cover substrate may be applied to the inside of the vehicle. That is, the cover substrate may be applied to various portions to which the touch device is capable of being applied in the vehicle. Thus, the cover substrate may be applied to a dashboard and the like as well as the personal navigation display (PND) to realize a center information display (CID). However, this embodiment is not limited thereto. For example, the touch device may be used for various electronic products.

Features, structures, and effects described in the above embodiments are incorporated into at least one embodiment of the present disclosure, but are not limited to only one embodiment. Moreover, features, structures, and effects exemplified in one embodiment can easily be combined and modified for another embodiment by those skilled in the art. Therefore, these combinations and modifications should be construed as falling within the scope of the present disclosure. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A cover substrate disposed on an upper end of a display device comprising a display panel and a touch window, the cover substrate comprising:
    a first surface of which each of a first end and a second end in at least a first direction and a first end and a second end in a second direction is bent at a predetermined curvature radius; and
    a second surface is bent at a predetermined curvature radius in the same direction as the first surface,
    wherein the first end and the second end of the first surface in the first direction are directed to the display device,
    each of the first surface and the second surface has a curvature in a convex direction, and
    the curvature radius in the first direction and the curvature radius in the second direction are different from each other.

2. The cover substrate according to claim 1, wherein the first surface is to be in contact with an input device.

3. The cover substrate according to claim 1, wherein the first surface has a central portion between the first end and the second end in the first direction,
    the central portion is flat, and
    the first end and the second end of the first surface in the first direction are bent.

4. The cover substrate according to claim 3, wherein the second surface has a curvature radius in the first direction.

5. The cover substrate according to claim 3, wherein the second surface has a curvature radius in the first direction.

6. The cover substrate according to claim 1, wherein each of the curvature radius in the first direction and the curvature radius in the second direction ranges from about 5 R to about 1,000 R.

7. A cover substrate disposed on an upper end of a display device comprising a display panel and a touch window, the cover substrate comprising:
- a first layer; and
- a second layer on the first layer,
- wherein each of a first end and a second end of the first layer in at least a first direction and a first end and a second end of the first layer in a second direction is bent at a predetermined curvature radius,
- the second layer is bent at a predetermined curvature radius in the same direction as the first layer,
- the first end and the second end of the first layer in the first direction are directed to the display device,
- each of the first and second layers has a curvature in a convex direction, and
- the curvature radius in the first direction and the curvature radius in the second direction are different from each other.

8. The cover substrate according to claim 7, wherein the first layer and the second layer comprise materials corresponding to each other, respectively.

9. The cover substrate according to claim 7, wherein the first layer and the second layer comprise different materials, respectively.

10. A display device comprising:
- a display panel; and
- a touch window disposed on the display panel and comprising a cover substrate,
- wherein the cover substrate comprises:
    - a first surface of which each of a first end and a second end in at least a first direction and a first end and a second end in a second direction is bent at a predetermined curvature radius; and
    - a second surface is bent at a predetermined curvature radius in the same direction as the first surface,
- wherein the first end and the second end of the first surface in the first direction are directed to the display device,
- each of the first surface and the second surface has a curvature in a convex direction, and
- the curvature radius in the first direction and the curvature radius in the second direction are different from each other.

11. The display device according to claim 10, wherein an available area and a non-available area are defined on the cover substrate, and
the display device further comprises:
- a sensing electrode disposed on the available area; and
- a wired electrode disposed on the non-available area.

12. The display device according to claim 11, further comprising a substrate disposed on a lower portion of the cover substrate,
wherein the sensing electrode comprises:
- a first sensing electrode extending in one direction; and
- a second sensing electrode extending in a direction different from the one direction, and
- the first sensing electrode and the second sensing electrode are disposed on the same surface of the substrate.

13. The display device according to claim 12, wherein at least one of the first sensing electrode and the second sensing electrode has a mesh shape.

14. The display device according to claim 11, wherein the sensing electrode comprises:
- a first sensing electrode extending in one direction; and
- a second sensing electrode extending in a direction different from the one direction, and
- the first sensing electrode and the second sensing electrode are disposed on the same surface of the cover substrate.

15. The display device according to claim 10, wherein the first surface is to be in contact with an input device.

16. The display device according to claim 10, wherein the first surface has a central portion between the first end and the second end,
the central portion is flat, and
the first end and the second end of the first surface in the first direction are bent.

17. The display device according to claim 10, wherein each of the curvature radius in the first direction and the curvature radius in the second direction ranges from about 5 R to about 1,000 R.

18. The display device according to claim 10, wherein the cover substrate comprises glass or plastic.

19. The display device according to claim 10, wherein the first end of the first surface in the first direction is bent at different curvature radius from the second end of the first surface in the first direction.

20. The display device according to claim 10, wherein the first end of the first surface in the first direction is bent at the same curvature radius as the second end of the first surface in the first direction.

* * * * *